United States Patent [19]
Grufman

[11] Patent Number: 6,014,593
[45] Date of Patent: Jan. 11, 2000

[54] MEMORY READING MODULE HAVING A TRANSPARENT FRONT WITH A KEYPAD

[75] Inventor: Hans Grufman, Huskvarna, Sweden

[73] Assignee: Viking Sewing Machines AB, Huskvarna, Sweden

[21] Appl. No.: 08/972,110

[22] Filed: Nov. 17, 1997

[30] Foreign Application Priority Data

Nov. 19, 1996 [SE] Sweden ................................. 9604237

[51] Int. Cl.[7] .............................. G06F 19/00; G06G 7/66
[52] U.S. Cl. ....................... 700/136; 112/102.5; 112/456; 112/458; 112/470.01; 700/137; 700/138
[58] Field of Search ......................... 364/470.02, 470.03, 364/470.04, 470.06, 470.07, 470.08; 112/102.5, 470.06, 470.01, 456, 458; 700/136, 137, 138, 139

[56] References Cited

U.S. PATENT DOCUMENTS

| | | | |
|---|---|---|---|
| 4,250,495 | 2/1981 | Beckerman et al. | 340/365 |
| 4,488,300 | 12/1984 | Horey et al. | 371/21 |
| 5,218,916 | 6/1993 | Kurono et al. | 112/121.12 |
| 5,355,319 | 10/1994 | Matsubara | 364/470 |
| 5,390,126 | 2/1995 | Kongho et al. | 364/470 |
| 5,474,000 | 12/1995 | Mizuno et al. | 112/102.5 |
| 5,782,189 | 7/1998 | Hirata et al. | 112/102.5 |
| 5,831,858 | 11/1998 | Wakayama | 364/470.09 |
| 5,867,391 | 2/1999 | Muto | 364/470.08 |

FOREIGN PATENT DOCUMENTS

671979 A5 of 0000 Switzerland .

Primary Examiner—Paul P. Gordon
Assistant Examiner—Ramesh Patel
Attorney, Agent, or Firm—Pearne, Gordon, McCoy & Granger LLP

[57] ABSTRACT

A module (1) is removably and replaceably provided on a sewing machine for domestic use and includes an electronic memory unit (4) for storing of specific stitch patterns selectable to control drive arrangements included in the sewing machine. The memory unit (4) is insertable behind a transparent front (3) provided on the sewing machine and having a touch control keyboard (31). The side of the memory unit (4) which, when inserted, is turned outwards to be visible through the keyboard (31) of the front has preprinted pattern illustrations. Each of these pattern illustrations correspond to a touch key on the front keyboard.

11 Claims, 7 Drawing Sheets

MEMORY READING MODULE HAVING A TRANSPARENT FRONT WITH A KEYPAD

BACKGROUND OF THE INVENTION

1. Field of the Invention

The present invention relates to a module for reading of an electronic memory unit provided for storing of specific sewing patterns selectable to be used for the control of a domestic sewing machine. The invention also relates to a domestic sewing machine incorporating such module.

2. Description of Related Art

Sewing machines having memory units for stitch determination are known, e.g. from SE-C-420 327. The module for this known sewing machine has the shape of a memory cassette, wherein the pattern stored in the memory of the cassette is printed on the outer surface of the cassette so that the operator obtains a reference for pattern selection. A keyboard mounted on the sewing machine or connected to the same is used for carrying out the selection. A disadvantage with this type of memory unit is that the operator cannot make any direct selection of the desired stitch pattern.

In connection with sewing machines, it is also known to use memory cards having codes for the determination of stitches stored thereon. A memory card being is insertable in a holder, provided for this purpose on the sewing machine, at the same time as a separate display card with preprinted stitch pattern symbols, associated with the memory card, is applied over a keyboard which is mounted on or connected to the sewing machine. The most apparent drawback of this known device is that it requires the operator to apply both a memory card and a display card before a stitch pattern selection can be made. In addition, it must be kept in mind which display card belongs to which memory card in case several such cards are available for use.

In connection with sewing machines, it is also known to use modules in the shape of memory cards with preprinted stitch determining codes for patterns that can be performed. Upon the memory card being placed in a holder, provided for it on the sewing machine, the patterns are presented on a separate graphic display for selection of patterns via touch control keys provided on the separate display unit or via a separate keyboard provided on or connected to the sewing machine. A drawback of this known device is connected with the demand for a graphic display which involves a considerable cost.

SUMMARY OF THE INVENTION

An object of the present invention is to remedy the obvious drawbacks associated with the known devices referred to above and used for storing and control of desired stitch patterns in domestic sewing machines. In accordance with the present invention, a module comprising a transparent front is provided with a touch control keyboard, and a memory unit is insertable behind the front so that a side of the memory unit which, after being inserted is facing the keyboard provided on the front, is provided with visible preprinted pattern illustrations each of the illustrations are associated with a corresponding touch key on the keyboard.

The invention also includes a sewing machine for domestic use that is provided with a removable and replaceable module according to the invention.

Accordingly, by placing in a module a memory unit, having on its outward side preprinted stitch pattern illustrations, behind a front, preferably removably provided on the sewing machine at its front side facing the operator and comprising a touch control keyboard, it is possible to achieve:

direct selection of the desired stitch pattern only one detail (the memory unit) needs to be applied to the sewing machine before the selection of the stitch pattern;

mixing of associated details (memory and display cards) will no longer be possible; and the high cost for a graphic display is avoided.

The front of the module covers a chamber provided for supporting the memory unit. The front can have the shape of an openable door provided with a hinge. In another embodiment, at one short side the door is provided with a slot for the insertion of the memory unit by means of a slide member into the chamber disposed behind the front.

Preferably, the memory unit is of a simple design, such as a memory card or smart card, and may contain conventional stitch patterns as well as embroidery patterns. In the latter case, of course, extended memory capacity is required.

BRIEF DESCRIPTION OF THE DRAWINGS

Various preferred embodiments of the module supporting mechanism of the sewing machine will be described in more detail below with reference to the enclosed drawings, in which.

DETAILED DESCRIPTION OF THE PREFERRED EMBODIMENTS

Figure 1:
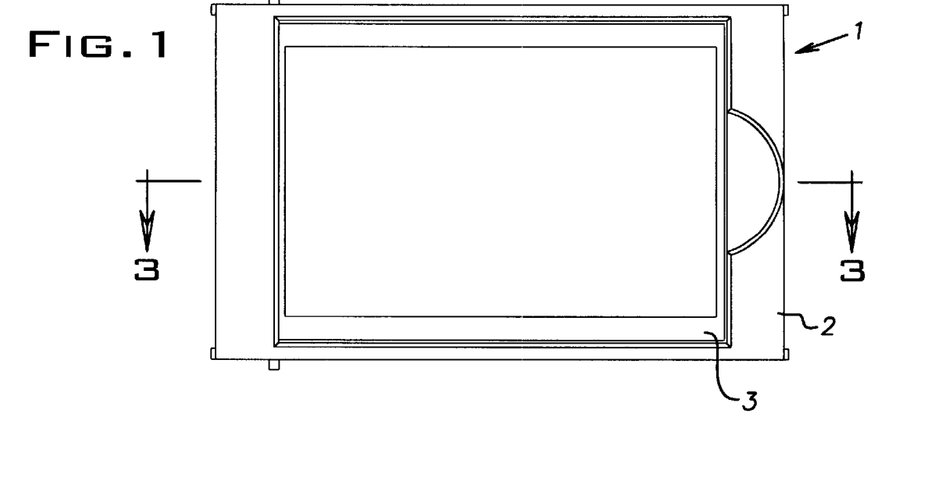
FIG. 1 is a front view of a first embodiment of the module according to the invention showing an openable front door.
Figure 2:
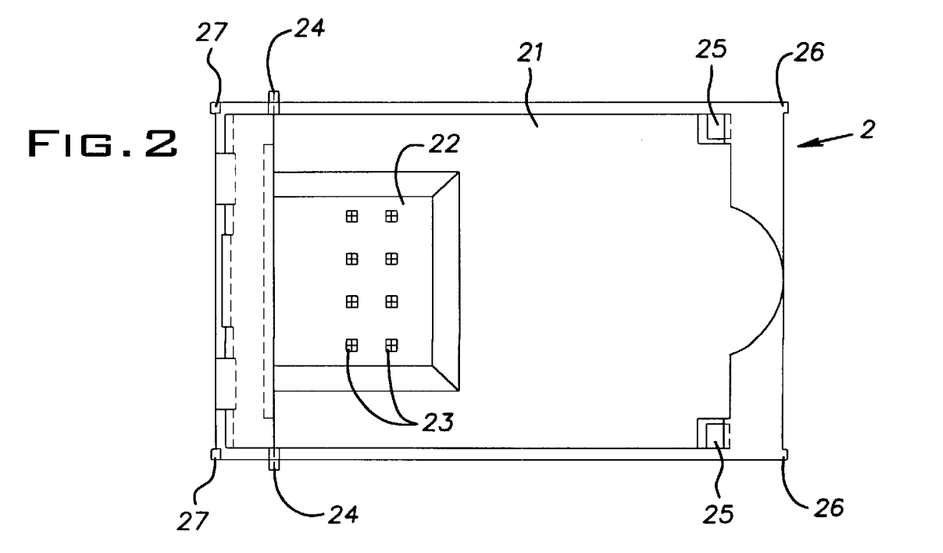
FIG. 2 is a front view of a holder associated with the module according to the invention.

FIG. 1 shows a front view of a preferred embodiment of a module 1 according to the invention. The module 1 comprises a holder 2 and a door 3 pivotably journalled at the front of the module. As shown in FIG. 2, the holder 2 has an interior, mainly planar wall 21 which has a raised section 22 provided with electrical contact elements 23. At one short side of the the holder 2 a hinge 24 is provided at the top and bottom, respectively, of the holder for the pivotable journalling of the door 3. At the opposite short end of the holder 2 snap-in lock means 25 are provided for retaining the door 3 in its closed position.

Figure 3:
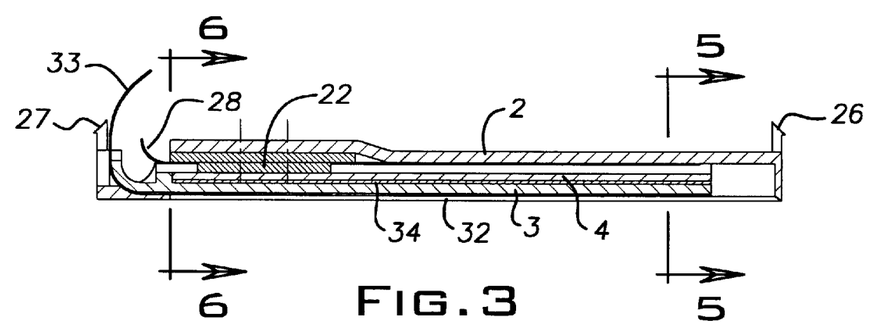
FIGS. 3 and 4 are sectional views of the module as seen along the line 3—3 in FIG. 1, showing the module with the door in a closed and open position, respectively.
Figure 4:
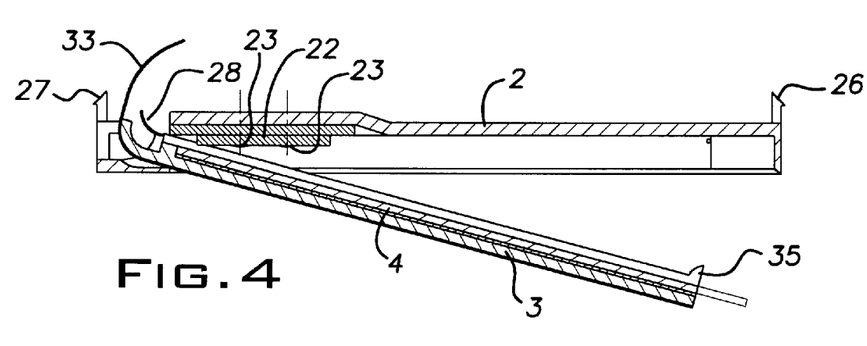

FIGS. 3 and 4 show the module 1 from above and show that the holder 2 is provided with snap-in means 26, 27. These snap-in means 26, 27 are provided to secure the module 1 on the sewing machine (not shown) to be controlled by the module 1 according to the invention. The sewing machine, which is a common type domestic sewing machine, is provided with fixing means cooperating with the snap-in means 26, 27 and preferably provided on the front side of the sewing machine facing the operator.

FIG. 3 shows the module 1 in a section with the door closed, whereas FIG. 4 shows a corresponding sectional view of module with the door in an open position.

In FIGS. 3 and 4 it is shown that the contact elements 23 on the raised section 22 of the holder 2 are electrically connected to contact leads 28 which are (not shown) connected, to the drive arrangements (not shown) of the sewing machine via electronic circuitry known per se.

The door 3 of the module 1 according to the invention forms a front comprising, as appears from the sectional views 3—3, 5—5 and 6—6 of FIGS. 3—6, respectively, a plane surface 31 covered by a touch sensor element 32 in the shape of a touch control keyboard. Preferably, the keys of the keyboard 32 are distributed in a known bar pattern and are electrically connected via contact leads 33 to the electronic circuitry and drive arrangements (not shown) of the sewing machine.

Figure 5:
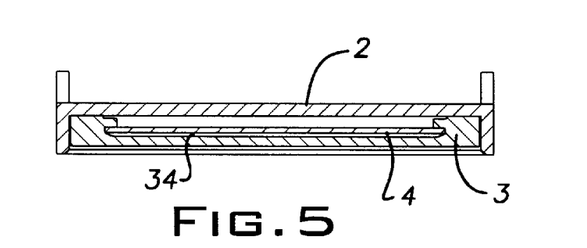
FIG. 5 shows a sectional view as seen along the line 5—5 in FIG. 3.
Figure 6:
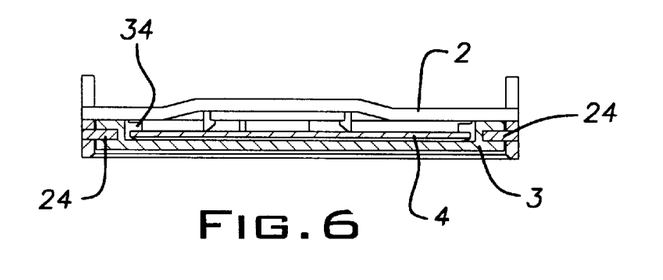
FIG. 6 shows a sectional view as seen along the line 6—6 in FIG. 3.

The planar surface 31 of the door 3, which supports the keyboard 32, is transparent for showing to permit view of a memory unit 4 insertable in a chamber 34 provided on the inside of the door 3. The memory unit 4 is contained in a slot opening provided in the walls of the chamber 34 as best shown in FIGS. 5 and 6.

Figure 7:
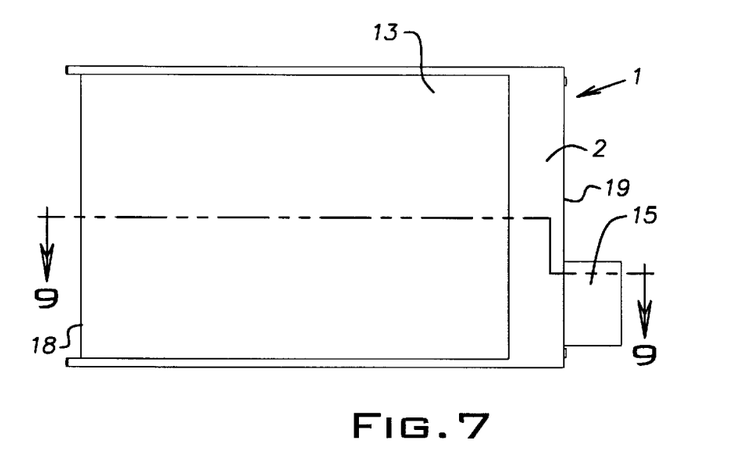
FIGS. 7 and 8 show front views of an alternative embodiment of the module according to the invention provided with an insertable and retractable slide member.
Figure 8:
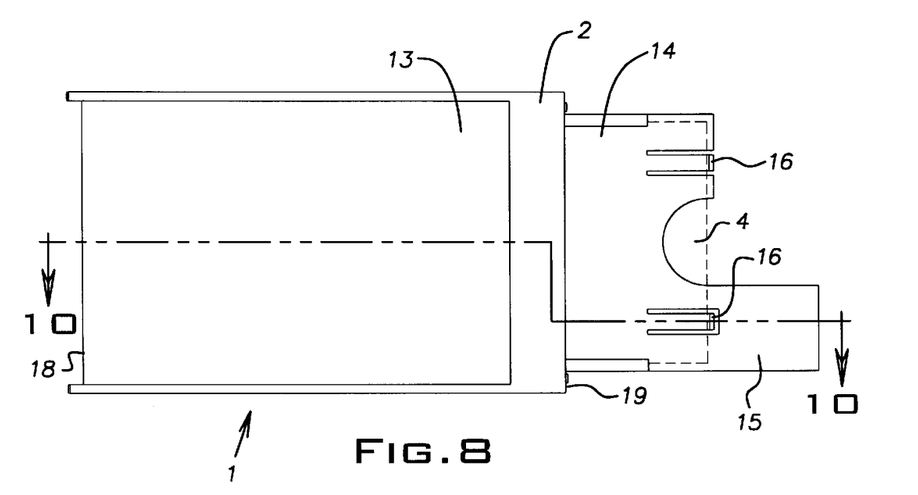

As is shown in FIGS. 7 and 8, in an alternative embodiment of the module 1 according to the present invention the holder 2 has a permanently closed front 13. The holder 2 supports a slide member 14 that is provided with an engagement tongue 15 is, respectively, insertable into and retractable out of the chamber 34 of the module 1 via a slot provided at one short side of the module 1.

In its retracted or extended position, FIG. 8, the slide member 14 can be loaded with a memory unit 4. The memory unit 4 is retained on the slide member 14 by means of catch levers 16 provided on the slide member. These catch levers 16 are resiliently disposed on the slide member 14 for engaging with corresponding recesses provided in the memory unit 4. Accordingly, when a memory unit 4 is to be removed from the slide member 14 the catch levers 16, against the resilient action of the same, have to be brought out of engagement with the recesses.

Figure 9:
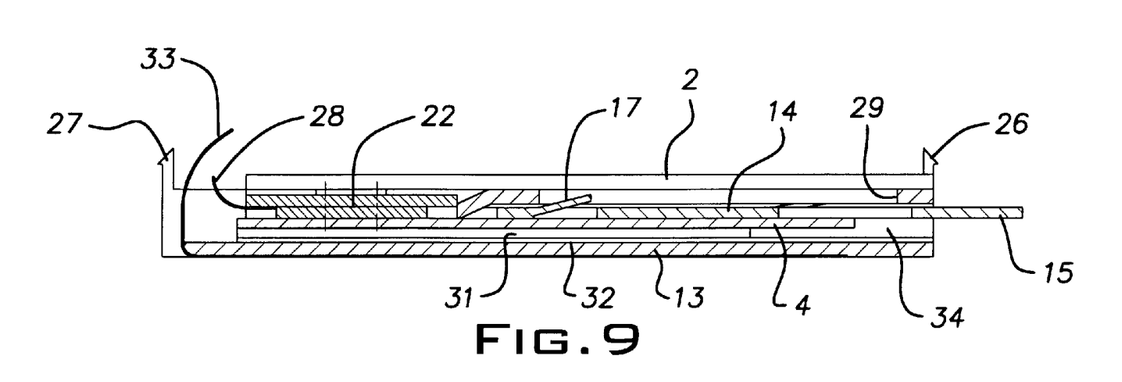
FIG. 9 shows a sectional view as seen along the line 9—9 in FIG. 7.
Figure 10:
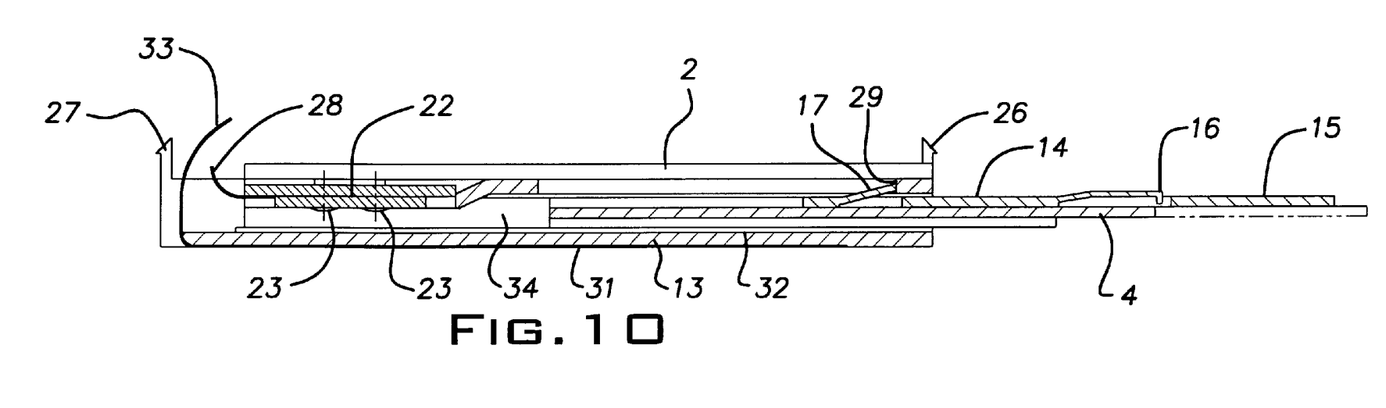
FIG. 10 shows a sectional view as seen along the line 10—10 in FIG. 8.

In order to limit the retractive movement of the slide member 14 said slide member is provided with a stop member 17 which, in the fully retracted or extended position of the slide member cooperates with corresponding stop shoulders 29 disposed on the surface of the holder 2 facing the chamber 34 of the module 1 to limit movement of the slide member 14, see FIGS. 9 and 10.

In other respects, the various parts of the alternative embodiment correspond to those described in connection with the embodiment of FIGS. 1–6. Accordingly, any further description of functional nature should not be needed. Further support to that effect is that reference numerals used in FIGS. 7–10 correspond to those used in the previous figures as the components of the modules are to a great extent identical.

Figure 12:
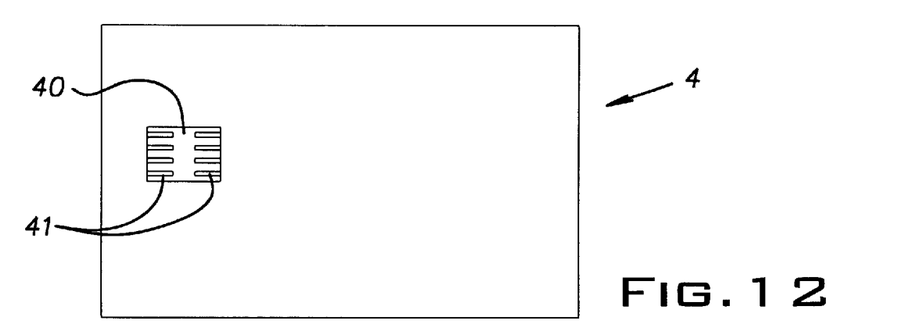
Figure 13:
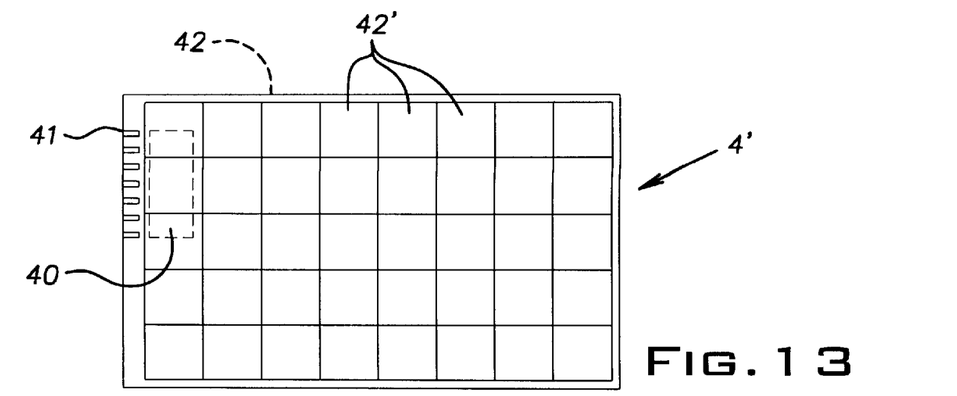
FIG. 13 shows an alternative embodiment of the the memory unit.

Preferably, the memory unit is a computer card, a so-called smart card, the back side of which has a chip 40 provided with contact elements 41, as shown in FIG. 12. As appears from FIG. 13, in an alternative embodiment of the memory unit 4, the contact elements 41 are provided along one short side of the memory unit 4'. With the encased memory (chip) 40 disposed adjacent to the same short side it is possible to provide graphics 42, 42' on both surface planes of the memory unit.

Figure 11:
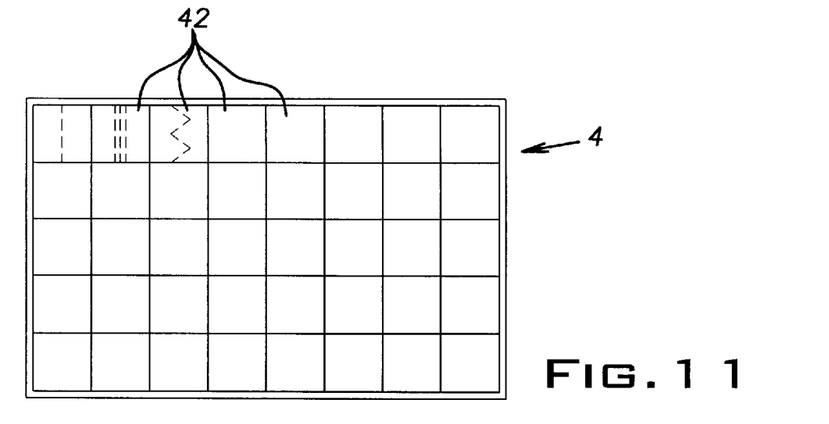
FIGS. 11 and 12 show the front and back side, respectively, of a memory unit provided for the module according to the invention.

The front of the memory unit 4 (i.e. one of the surface planes), shown in FIG. 11, has graphics with preprinted pattern illustrations 42 (only a few of which being shown in the figure) arranged with a pitch corresponding to the keys of the touch control keyboard 32 of the front 3, 13 of the module.

The memory unit is programmed with a number of stitch patterns and/or embroidery patterns, each of which corresponding to one preprinted pattern illustration 42. In the embodiment shown in FIG. 11 the memory unit 4 is dimensioned for 40 different stitches and/or stitch patterns in accordance with the preprinted pattern illustrations determined by the design of the touch control keyboard 32. Of course, the number and the shape of the pattern illustrations can be varied if the keys on the front 3, 13 of the touch control keyboard 32 are modified.

In use of the module 1 according to the invention, the sewing machine to be controlled is provided, preferably on its front, with recesses in which the snap-in means 26, 27 of the holder 2 of the module 1 can be inserted and with suitable contact arrangements for connecting of the contact leads 28, 33 of the module 1 to the electronic circuitry provided in the sewing machine for the control of the various control arrangements of the sewing machine. After securing of the holder 2 to the sewing machine, the module 1 can be loaded with a selectable memory unit 4.

The memory unit 4 is inserted in the chamber 34 with its front (FIG. 11) facing the touch control keyboard 32 of the front 3, 13. Then, the operator can see the preprinted pattern illustrations 42 through the transparent surface 31 of the front 3, 13. When the memory unit 4 has been fully inserted, by touching a touch key disposed opposite the preprinted pattern illustration with the desired stitch or embroidery pattern the operator can activate the sewing machine for performing the desired work operation.

Figure 14:
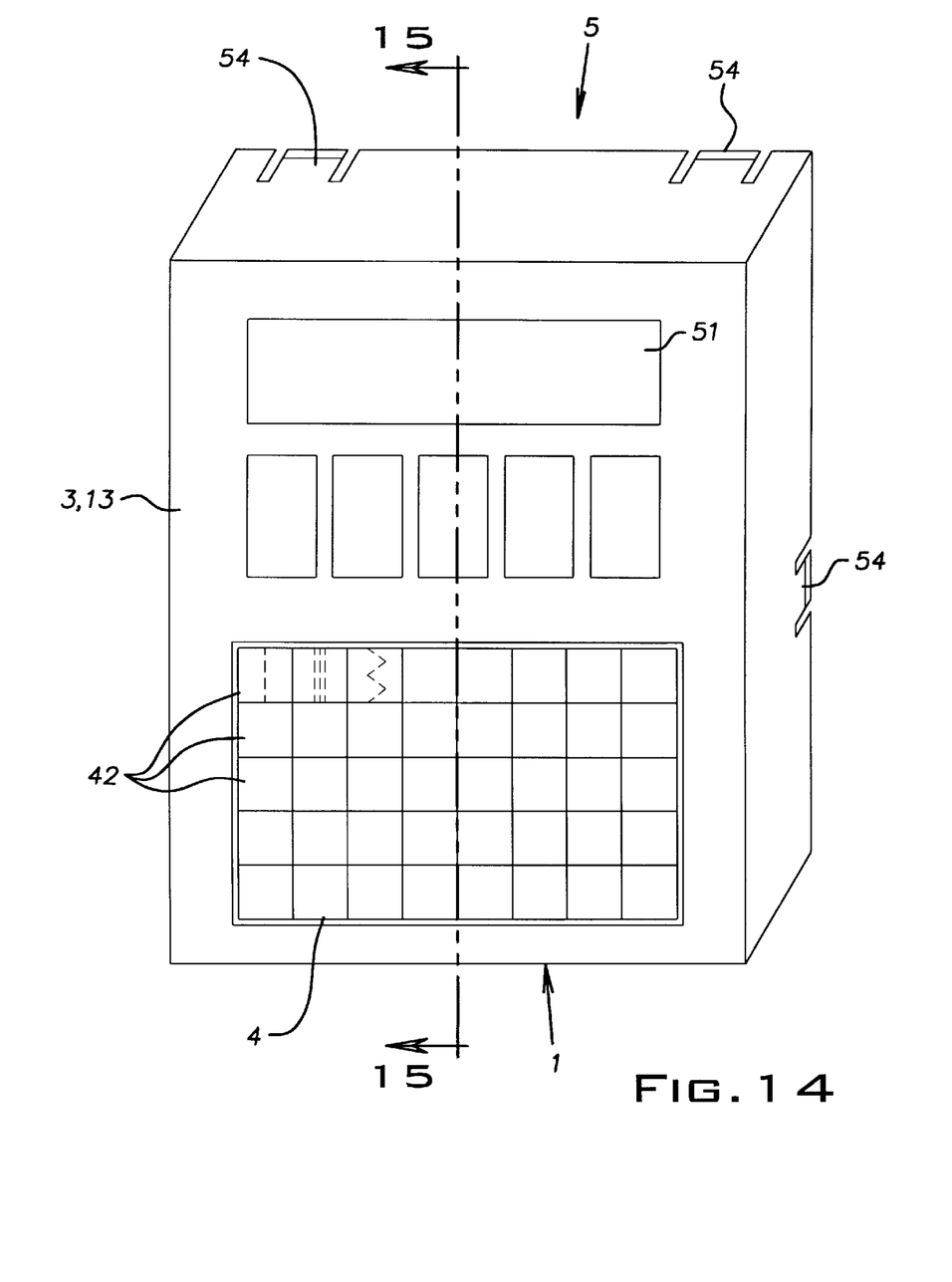
FIG. 14 shows a perspective view of the module of the present invention combined with a foil keyboard.
Figure 15:
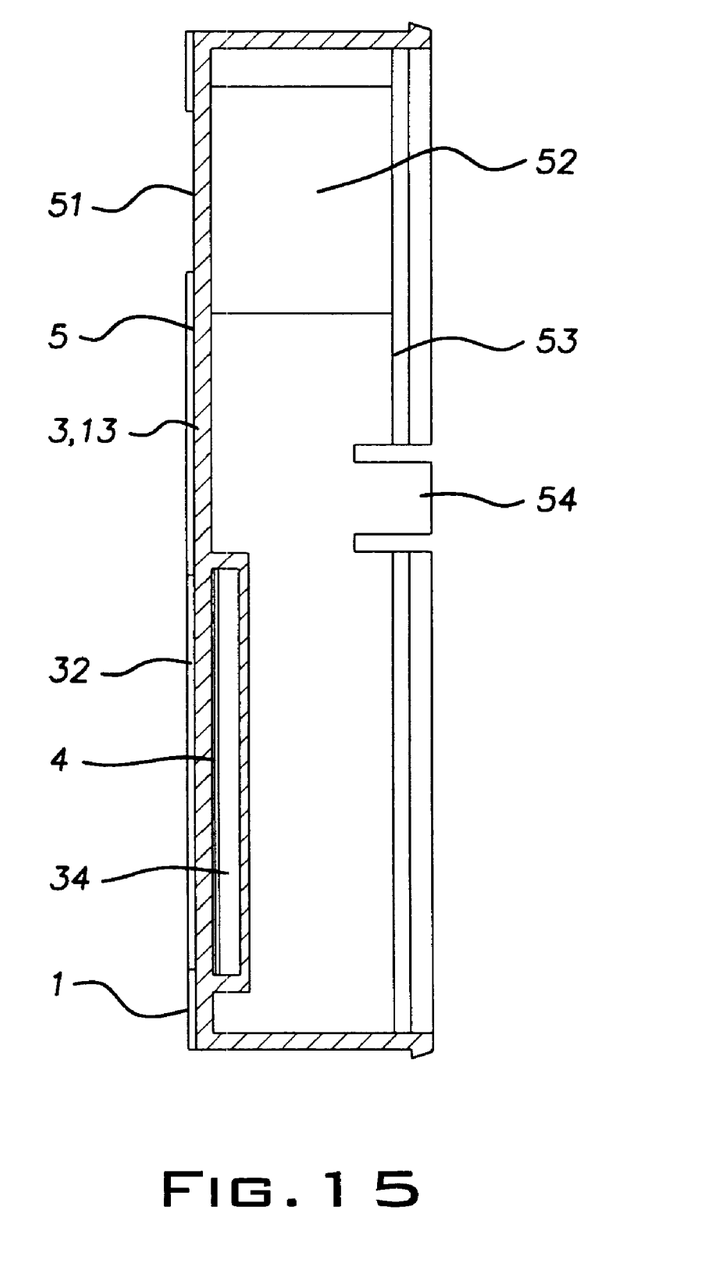
FIG. 15 shows a sectional view as seen along the line 15—15 in FIG. 14.

Advantageously, the module 1 according to the present invention can be combined with the foil keyboard 5 commonly used on electrically controlled sewing machines, as shown in FIGS. 14 and 15. In this connection the transparent front 3 or 13 of the module 1 is common both for the module 1 and the foil keyboard 5, thus forming a unit which, by means of tongues 54, can be snapped-in on the front (not shown) of the sewing machine, on which also electrical connecting means are disposed for connecting the electric circuits of this unit with the operating means of the sewing machine. The foil keyboard 5 includes windows 51 for LCD-elements which are mounted under the front 3 or 13. Through the touch control keyboard 32 of the module 1, the pattern illustrations 42 of the memory unit 4 inserted in the chamber 34 are visible. Accordingly, the transparent front 3 or 13 supports the touch control keyboard 32 and constitutes a contact means for the memory unit (smart card) 4 and the foil keyboard 5.

The combined unit described above will be more clearly understood from section 15—15 shown in FIG. 15. The body 3 (or 13) of transparent material forms a cover having a window 51 for the LCD-elements 52 provided in the cover. The LCD-elements, in a way known per se, are electrically and mechanically supported by a control card 53 eventually being provided also with other electrical components required for the control of the sewing machine. Advanteously, the control card 53 also forms a base of the cover. As appears from FIG. 15 and in accordance with the above description, the body 3; 13 has a separate space 34 for the memory unit 4 (or 4').

Due to the fact that the foil keyboard 5 can be designed as a frame surrounding the touch control keyboard 32, no unnecessary joints will appear on the control panel of the sewing machine and connections from the touch control keyboard will not be visible.

Even though preferred embodiments of the module according to the invention have been described and shown in the drawings it is apparent for the man skilled in the art that modifications can be made within the scope of the invention. For example, memory units with a different contact system can be used, the door can be pivotably journalled in a different plane than that shown, the snap-in fixing of the holder on the sewing machine can be replaced by different fixing means and so on. Accordingly, the invention must not be considered to be restricted to the embodiments described with reference to the drawings.

What is claimed is:

1. A module for reading of an electronic memory unit (4) provided for storing of specific stitch patterns selectable for control of a domestic sewing machine, wherein said module (1) comprises a transparent front (3;13) with a touch control keyboard (32), said memory unit (4) being insertable behind said transparent front (3;13), a side of the memory unit (4) which, when inserted, faces the keyboard (32), is provided with visible pattern illustrations (42), each of said pattern illustrations corresponding to a touch key on the keyboard (32).

2. The module according to claim 1, wherein the memory unit (4) is a computer card and a side of the card which is turning inwards and is opposite the side having the preprinted pattern illustrations (42) is provided with electrical contact elements (41) cooperating with corresponding contact elements provided in the sewing machine and connecting to code converting means provided in the sewing machine.

3. The module according to claim 1, wherein the transparent front has the shape of a door (3) pivotably journalled in a holder (2), said holder being replaceably mounted by snap-in action in a recess in the front of the sewing machine facing the operator.

4. The module according to claim 3, wherein a hinge (24) of the pivotably journalled door (3) is disposed on one short side of the door while, at the opposite short side of the door, snap-in locking means (35) are provided for retaining the door (3) in a closed position.

5. The module according to claim 3, wherein contact leads (28,33) are disposed at the short side of the door (3) provided with a hinge, said contact leads (28,33) connecting a keyboard touch foil (31) and contact elements (23) on an engagement surface (22) of the holder (2) with the drive arrangements of the sewing machine.

6. The module according to claim 1, wherein the front comprises a transparent frame (13) with a surface (31) supporting the keyboard, said frame (13) along one short side (18) having a slot for the insertion of the memory unit (4) into the transparent frame (13) and under the surface (31) supporting the keyboard.

7. The module according to claim 6, wherein, under its transparent surface (31) which supports the keyboard, the front (3;13) has a chamber (34) for receiving the memory unit (4) so that, when the memory unit (4) is fully inserted in the chamber (34), the contact elements (41) of the memory unit connect to corresponding contact elements (23) provided on an engagement surface (22) in the holder (2) for the side of the memory unit (4).

8. The module according to claim 6, wherein contact leads (28,33) are provided at a short side (19) of the frame (13) opposite the frame side (18) provided with the slot, said contact leads connecting a touch foil (31) and the contact elements (23) on the engagement surface (22) of the holder (2) with the drive arrangements of the sewing machine.

9. The module according to claim 6, wherein the memory unit (4) is insertable by means of a sliding member (14) journalled in the side slot, the memory unit (4) being placed on the sliding member when the sliding member is in a retracted position, said memory unit (4) together with the sliding member being inserted into the transparent frame (13) under the surface (31) supporting the keyboard as said sliding member is moved from said retracted position to an inserted position.

10. The module according to claim 1, further comprising a foil keyboard (5), said transparent front (3;13) of the module (1) being common for the module (1) and the foil keyboard (5).

11. A domestic sewing machine having a front defining a recess in which a holder (2) is fixed by snap-in action, said holder (2) receiving a module, said module comprising a transparent front (3;13) with a touch control keyboard (32) and being adapted to read an electronic memory unit (4), wherein the memory unit (4) includes preprinted pattern illustrations (42) and is insertable behind the module transparent front (3;13) so that one side of the memory unit, after being inserted, is turned outwards so that said preprinted pattern illustrations (42) are visible through the keyboard (31), each of said preprinted pattern illustrations (42) corresponding to a touch key on the keyboard (31).

* * * * *

UNITED STATES PATENT AND TRADEMARK OFFICE
CERTIFICATE OF CORRECTION

PATENT NO. : 6,014,593
DATED : January 11, 2000
INVENTOR(S) : Grufman

It is certified that error appears in the above-indentified patent and that said Letters Patent is hereby corrected as shown below:

```
column 1, line 24, delete "being".

column 2, line 1, delete "pattern" and insert --pattern;--.

column 2, line 5, before "mixing" insert --accidental--.

column 3, line 2, after "the" insert --module with the--.

column 3, line 21, delete "plane" and insert --planar--.

column 3, line 28, delete "for showing".

column 3, line 28, delete "view" and insert --viewing--.

column 3, line 37, after "15", insert --and,--.

column 4, line 5, delete "side" and insert --side,--.

column 4, line 18, delete "FIG. 11" and insert --FIG. 11,--.
```

Signed and Sealed this

Fifteenth Day of May, 2001

*Attest:*

NICHOLAS P. GODICI

*Attesting Officer*   *Acting Director of the United States Patent and Trademark Office*